United States Patent [19]
Shiiba et al.

[11] Patent Number: 5,816,979
[45] Date of Patent: Oct. 6, 1998

[54] VEHICLE CONTROL APPARATUS CAPABLE OF SELECTIVE SLIP CONTROL OF LOCK-UP CLUTCH DURING DECELERATION AND AUTOMATIC SHIFT-DOWN OF TRANSMISSION DURING DOWNHILL ROAD RUNNING

[75] Inventors: Kazuyuki Shiiba; Kunihiro Iwatsuki; Tooru Matsubara, all of Toyota, Japan

[73] Assignee: Toyota Jidosha Kabushiki Kaisha, Toyota, Japan

[21] Appl. No.: 845,033

[22] Filed: Apr. 21, 1997

[30] Foreign Application Priority Data

Apr. 25, 1996 [JP] Japan .................................. 8-104854

[51] Int. Cl.$^6$ .................................................. F16H 61/14
[52] U.S. Cl. .......................... 477/176; 477/174; 477/901
[58] Field of Search .................................. 477/176, 169, 477/174, 175, 901

[56] References Cited

U.S. PATENT DOCUMENTS

| 5,569,117 | 10/1996 | Kono et al. | 477/176 X |
|---|---|---|---|
| 5,588,937 | 12/1996 | Kono et al. | 477/169 |
| 5,620,390 | 4/1997 | Kono et al. | 477/169 X |
| 5,626,535 | 5/1997 | Kono et al. | 477/174 X |
| 5,643,136 | 7/1997 | Kono et al. | 477/174 X |
| 5,667,458 | 9/1997 | Narita et al. | 477/169 |
| 5,678,667 | 10/1997 | Kono et al. | 477/176 X |
| 5,697,479 | 12/1997 | Kono et al. | 477/176 X |
| 5,733,223 | 3/1998 | Matsubara et al. | 477/175 |

FOREIGN PATENT DOCUMENTS 7-103329  4/1995  Japan .

*Primary Examiner*—Charles A. Marmor
*Assistant Examiner*—Peter T. Kwon
*Attorney, Agent, or Firm*—Oblon, Spivak, McClelland, Maier & Neustadt, P.C.

[57] ABSTRACT

An apparatus for controlling an automatic transmission and a lock-up clutch of a fluid-filled power transmitting device of a motor vehicle, including a downhill running control device for shifting down the transmission when the vehicle initiates a downhill road running, and a deceleration slip control device for effecting a slip control of the clutch during vehicle deceleration, and a deceleration control device for permitting the deceleration slip control device to effect the slip control of the lock-up clutch and inhibits the downhill running control device from shifting down the transmission, if a condition required for activating the deceleration slip control device has been satisfied, and if the motor vehicle is in a downhill road running.

11 Claims, 11 Drawing Sheets

FIG. 2

| SHIFT POSITION | | SOLENOID VALVES | | C1 | C2 | B1 | B2 | F1 | B3 | F2 | C0 | F0 | B0 |
|---|---|---|---|---|---|---|---|---|---|---|---|---|---|
| | | S1 | S2 | | | | | | | | | | |
| P | | ⊗ | ⊗ | | | | | | | | ○ | | |
| R | | ⊗ | ⊗ | | ○ | | | | ○ | | ○ | | |
| N | | ⊗ | ⊗ | | | | | | | | ○ | | |
| D | 1st | ○ | × | ○ | | | | | | | ○ | ○ | |
| | 2nd | ○ | ○ | ○ | | | ○ | | | ○ | ○ | ○ | |
| | 3rd | × | ○ | ○ | ○ | | ○ | | | | ○ | ○ | |
| | O/D | × | × | ○ | ○ | | ○ | | | | | | ○ |
| S | 1st | ○ | × | ○ | | | | | | | ○ | ○ | |
| | 2nd | ○ | ○ | ○ | | | ○ | ○ | | ○ | ○ | ○ | |
| | 3rd | × | ○ | ○ | ○ | ○ | ○ | | | | ○ | ○ | |
| | (O/D) | × | × | ○ | ○ | | ○ | | | | | | ○ |
| L | 1st | ○ | × | ○ | | ○ | | | | | ○ | ○ | |
| | 2nd | ○ | ○ | ○ | | ○ | ○ | ○ | ○ | ○ | ○ | ○ | |

# 5,816,979

VEHICLE CONTROL APPARATUS CAPABLE OF SELECTIVE SLIP CONTROL OF LOCK-UP CLUTCH DURING DECELERATION AND AUTOMATIC SHIFT-DOWN OF TRANSMISSION DURING DOWNHILL ROAD RUNNING

The present application is based on Japanese Patent Application No. 8-104854 filed Apr. 25, 1997, the content of which is incorporated hereinto by reference.

BACKGROUND OF THE INVENTION

1. Field of the Invention

The present invention relates to an apparatus for controlling a lock-up clutch and an automatic transmission provided in a power transmitting system of a motor vehicle.

2. Discussion of the Related Art

In a motor vehicle having a fluid-filled power transmitting device equipped with a lock-up clutch such as a torque converter or fluid coupling incorporating such a lock-up clutch, it is proposed to control the lock-up clutch in a slip control mode (partially slipping or engaging mode) such that an actual amount of slip (slip speed) of the lock-up clutch coincides with a predetermined target slip speed, during deceleration or coasting of the vehicle with the accelerator pedal being released, for the purpose of improving the fuel economy of the vehicle. Described in detail, the slip control mode is available on a motor vehicle equipped with a fuel-cut control device adapted to cut a fuel supply to the engine while the engine speed is higher than a predetermined fuel-cut speed during deceleration or coasting of the vehicle. The slip control of the lock-up clutch during deceleration of the vehicle (hereinafter referred to as "deceleration slip control" of the lock-up clutch, where appropriate) is effected for the purpose of raising the engine speed by a drive force transmitted to the engine from the vehicle drive wheels through the partially engaging or slipping lock-up clutch, so that the engine speed is kept above the fuel-cut speed for a prolonged period of time, to thereby effect the fuel cut of the engine for such a prolonged period of time. An example of a deceleration slip control apparatus for controlling the lock-up clutch as described above is disclosed in JP-A-7-103329.

There is also known a shift control apparatus for controlling an automatic transmission of a motor vehicle, which incorporates downhill running control means for automatically shifting down the transmission from a currently selected position to a lower-gear position when the road on which the vehicle is running changes from a flat road to a downhill road. This shift-down action of the transmission aims to apply an engine brake to the vehicle for the purpose of improving the running stability on the downhill road. Where the vehicle equipped with the deceleration slip control apparatus as described above is also equipped with this type of shift control apparatus, the engine brake by the downhill running control means may be applied to the vehicle, together with an engine brake generated by the deceleration slip control apparatus, when the vehicle is coasting on the downhill road with the accelerator pedal being placed in the non-operated or fully released position. In this case, the operator of the motor vehicle feels uncomfortable with an excessive degree of engine brake application to the vehicle, and may lead to deteriorated running stability during deceleration of the vehicle on the downhill road. If the accelerator pedal is released to the non-operated position during a flat road run with the automatic transmission placed in the highest-gear (e.g., fourth-speed) position, and immediately before initiation of a downhill road run, the downhill running control means of the shift control apparatus and the deceleration slip control apparatus are both activated, whereby the vehicle running state is changed from a fourth-speed torque control mode (in which the transmission is placed in the fourth-speed position while the lock-up clutch is not fully engaged) to a third-speed slip control mode (in which the transmission is placed in the third-speed position while the lock-up clutch is under the deceleration slip control), whereby the deceleration value $G_N$ is suddenly increased to a comparatively large extent.

SUMMARY OF THE INVENTION

It is therefore an object of the present invention to provide an apparatus for controlling a lock-up clutch and an automatic transmission of a motor vehicle equipped with downhill running control means, which apparatus does not suffer from excessive engine brake application to the vehicle during deceleration of the vehicle on a downhill road.

The above object may be achieved according to the principle of the present invention, which provides an apparatus for controlling an automatic transmission, and a lock-up clutch of a fluid-filled power transmitting device disposed between an engine and the automatic transmission, in a power transmitting system of a motor vehicle, the apparatus comprising: (a) downhill running control means for shifting down the automatic transmission when the motor vehicle initiates a running on a downhill road; (b) deceleration slip control means for effecting a slip control to control an amount of slip of the lock-up clutch during deceleration of the motor vehicle; (c) slip control initiating condition determining means for determining whether at least one predetermined deceleration slip initiating condition required for activating the deceleration slip control means to initiate the slip control of the lock-up clutch has been satisfied; (d) downhill running determining means for determining whether the motor vehicle is running on a downhill road; and (e) deceleration control means for permitting the deceleration slip control means to effect the slip control of the lock-up clutch and inhibits the downhill running control means from shifting down the automatic transmission, if the slip control initiating condition determining means determines that the at least one predetermined deceleration slip initiating condition has been satisfied, and if the downhill running determining means determines that the motor vehicle is running on the downhill road.

In the vehicle control apparatus of the present invention constructed as described above, the deceleration control means is adapted to inhibit the downhill running control means from shifting down the automatic transmission if the slip control initiating condition determining means determines that the predetermined deceleration slip control initiating condition or conditions has/have been satisfied, even if the downhill running determining means determines that the vehicle is running on a downhill road. In this condition, therefore, only the deceleration slip control of the lock-up clutch by the deceleration slip control means is effected without the shift-down action of the automatic transmission during deceleration of the vehicle on the downhill road. Accordingly, the present control apparatus is adapted to prevent an excessive degree of engine brake application to the vehicle due to concurrent operations of the deceleration slip control means and the downhill running control means during deceleration of the vehicle on the downhill road. In other words, only the engine brake by the slip control of the lock-up clutch is applied to the vehicle, whereby the vehicle can be run with a high degree of stability. The deceleration control means is adapted to permit only the deceleration slip control of the lock-up clutch while inhibiting the shift-down action of the automatic transmission, when the vehicle is coasting with the accelerator pedal being fully released. In other words, the deceleration slip control of the lock-up clutch is dominant over the shift-down action of the automatic transmission when the accelerator pedal is released to the non-operated position to initiate a coasting run of the vehicle. This arrangement assures a higher degree of running stability of the vehicle, than in an arrangement in which the shift-down action of the automatic transmission is dominant over the deceleration slip control of the lock-up clutch, namely, only the shift-down action is permitted.

In one preferred form of this invention, the apparatus further comprises deceleration requirement determining means for determining whether the vehicle is required to be further decelerated during deceleration of the vehicle, and the deceleration control means is adapted to inhibit the downhill running control means from shifting down the automatic transmission during running of the vehicle on the downhill road, until the deceleration requirement determining means determines that the vehicle is required to be further decelerated. In this form of the invention, the deceleration control means permits the shift-down action of the automatic transmission by the downhill running control means only after the determination by the determining means that the vehicle is required to be further decelerated. In this condition, the vehicle is decelerated by a larger amount of brake application by both the deceleration slip control of the lock-up clutch and the shift-down action of the automatic transmission, whereby the deceleration value of the vehicle is increased to a higher level.

In a second preferred form of the invention, the deceleration control means is adapted to permit the downhill running control means to shift down the automatic transmission when the slip control of the lock-up clutch by the deceleration slip control means is terminated, while the downhill running determining means determines that the vehicle is running on the downhill road. For instance, the deceleration slip control of the lock-up clutch is terminated when the vehicle speed falls below the lower limit of a predetermined deceleration slip control range. In this form of the invention, the automatic transmission is shifted down by the downhill running control means, whereby the deceleration value is increased. Thus, the deceleration slip control of the lock-up clutch is followed by the shift-down action of the automatic transmission, so that the engine brake is first applied to the vehicle by the deceleration slip control, and is then applied by the shift-down action of the automatic transmission.

In a third preferred form of the invention, the deceleration control means is adapted to permit the downhill running control means to automatically shift down the automatic transmission and inhibits the deceleration slip control means from effecting the slip control of the lock-up clutch after a shift-down action of the automatic transmission, if the slip control initiating condition determining means determines that the at least one predetermined deceleration slip control initiating condition has not been satisfied, and if the downhill running determining means determines that the motor vehicle is running on the downhill road. In this form of the invention, the automatic transmission is permitted to be shifted down during running of the vehicle on a downhill road without the deceleration slip control of the lock-up clutch, so that the engine brake is applied to the vehicle by the shift-down action of the automatic transmission, while the engine brake application by the deceleration slip control of the lock-up clutch is inhibited after the shift-down action of the automatic transmission, to prevent an excessive amount of engine brake application to the vehicle.

In a fourth preferred form of the invention, the deceleration control means is adapted to permit the downhill running control means to shift down the automatic transmission during running of the vehicle on the downhill road, and inhibits the deceleration slip control means from effecting the slip control of the lock-up clutch after a shift-down action of the automatic transmission. In the present form of the invention, the shift-down action of the automatic transmission is permitted only where it is necessary to further decelerate the vehicle, and is inhibited while the vehicle is coasting without a need of further deceleration. This arrangement is effective to improve the fuel economy and the running stability of the vehicle.

BRIEF DESCRIPTION OF THE DRAWINGS

The above and optional objects, features, advantages and technical significance of the present invention will be better understood by reading the following detailed description of a presently preferred embodiment of the invention, when considered in conjunction of the accompanying drawings, in which:

FIG. 2 is a table indicating a relationship between the operating positions of an automatic transmission connected to the torque converter and the respective combinations of the operating states of first and second solenoid-operated valves of a shift control device;

DETAILED DESCRIPTION OF THE PREFERRED EMBODIMENT

Figure 1:
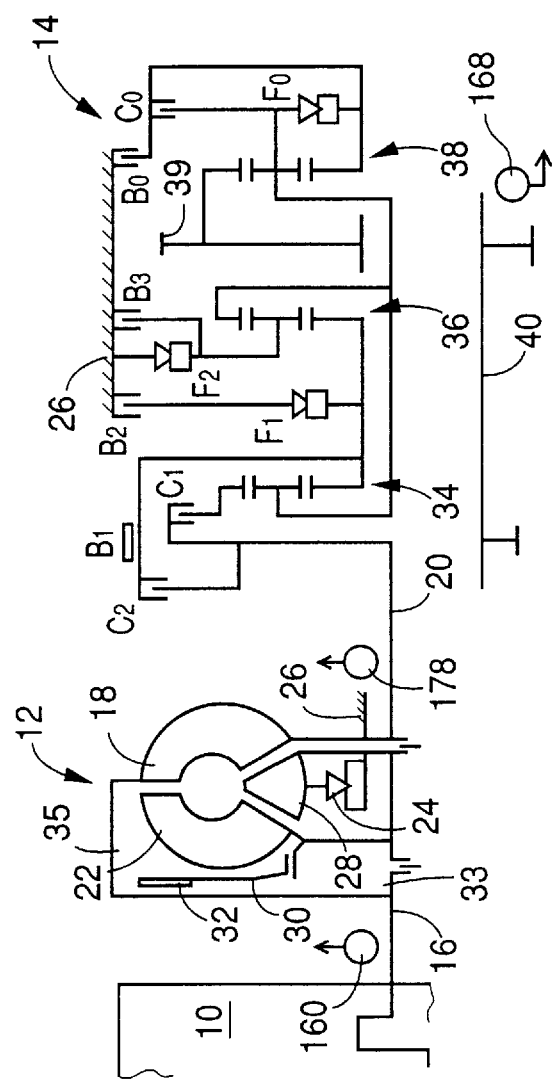
FIG. 1 is a schematic view illustrating a part of a power transmitting system of a motor vehicle, which incorporates an automatic transmission and a torque converter having a lock-up clutch, which are controlled by a control apparatus constructed according to one embodiment of the present invention.

Referring first to the schematic view of FIG. 1, there is shown a part of a power transmitting system of a motor vehicle, wherein power generated by an engine 10 is transmitted to a differential gear device and drive wheels through a torque converter 12 equipped with a lock-up clutch 32, and an automatic transmission 14 which includes three planetary gear sets to selectively establish a plurality of operating positions (gear positions).

The torque converter 12 includes; a pump impeller 18 connected to a crankshaft 16 of the engine 10; a turbine impeller 22 fixed to an input shaft of the automatic transmission 14 and rotatable by the pump impeller 18; a stator impeller 28 fixed to a stationary member in the form of a housing 26 through a one-way clutch 24; and the above-indicated lock-up clutch 32 connected to the input shaft 20 through the turbine impeller 22. The pump impeller 18 includes a radially outer portion which is U-shaped in cross section, and a plurality of curved vanes which are arranged in the circumferential direction and formed so as to cause a flow of a working oil, which flow includes a component moving toward the turbine impeller 22 on the side of the engine 10. The turbine impeller 22 includes a plurality of curved vanes opposed to the vanes of the pump impeller 18. In operation of the torque converter 12, the turbine impeller 22 is rotated by the oil flow from the vanes of the pump impeller 18 rotated by the engine 10. The lock-up clutch 32 includes a piston 30 which engages a hub of the turbine impeller 22 such that the piston 30 is axially slidable relative to and rotatable with the turbine impeller 22.

The piston 30 of the lock-up clutch 32 divides an interior of the torque converter 12 into two oil chambers 33 and 35. The lock-up clutch 32 is released and engaged by axial movements of the piston 32 depending upon a difference between oil pressures in these two oil chambers 33, 35, which will be hereinafter referred to as a releasing oil chamber 33 and an engaging oil chamber 35, respectively. Described more specifically, the piston 30 is retracted to its fully retracted position when the pressure in the releasing oil chamber 33 is increased while the engaging oil chamber 35 is drained. When the pressure in the engaging oil chamber 35 is increased while the releasing oil chamber 33 is held at the lowest level, the piston 30 is advanced to its fully advanced position. In the fully retracted position of the piston 30, the lock-up clutch 32 is placed in its fully released position in which the torque received by the pump impeller 18 is amplified or boosted at a ratio depending upon the ratio of the input and output speeds of the torque converter 12. In the fully advanced position of the piston 30, the lock-up clutch 32 is placed in the fully engaged position in which the frictional coupling portion of the clutch 32 is forced against the radially outer U-shaped portion of the pump impeller 18, whereby the pump impeller 18 is directly connected to the input shaft 20, that is, the crankshaft 16 as an input member of the torque converter 12 is directly connected to the input shaft 20 of the transmission 14, which serves as an output member of the torque converter 12. When the pressure in the releasing oil chamber 33 is increased to a predetermined level while the pressure in the engaging oil chamber 35 is held at a higher level, the piston 30 is advanced to a predetermined position in which the frictional coupling portion of the lock-up clutch is located near the corresponding coupling portion (radially outer U-shaped portion) of the pump impeller 18.

The automatic transmission 14 includes: the input shaft 20, a first, a second and a third planetary gear set 34, 36, 38; an output gear 39 which rotates with a ring gear of the third planetary gear set 38; and an output shaft in the form of a counter shaft 40 which connects the output gear 39 and the differential gear device. The planetary gear sets 34, 36, 38 include components which are connected integrally with each other, and components which are connected to each other when three clutches C0, C1, C2 are selectively engaged. The planetary gear sets 34, 36, 38 also include components which are fixed or connected to the housing 26 and thereby inhibited from rotating when four brakes B0, B1, B2, B3 are selectively engaged. The planetary gear sets 34, 36, 38 further include components which are connected to each other or to the housing 26 through three one-way clutches F0, F1, F2, depending upon the rotating directions of the components.

Each of the clutches C0, C1, C2 and brakes B0, B1, B2, B3 may consist of a multiple-disk clutch, or a band brake which uses two bands wound in opposite directions. These clutches and brakes are operated by respective hydraulically operated actuators, which are controlled by an electronic transmission controller 184 shown in FIG. 3 (which will be described), so as to selectively establish a plurality of operating positions of the automatic transmission 14. That is, the automatic transmission 14 has four forward drive positions, first-speed ("1st"), second-speed ("2nd"), 3rd-speed ("3rd") and overdrive ("O/D") positions, and one backward drive position "R", as indicated in FIG. 2. The four forward drive positions "1st", "2nd", "3rd" and "O/D" have respective different speed ratios I which decrease in the order of description. The speed ratio I is defined as the speed of the input shaft 20 divided by the speed of the counter shaft (output shaft) 40.

It is to be noted that the lower halves of the torque converter 12 and automatic transmission 14 and the upper half of the counter shaft 40 are not shown in FIG. 1 in the interest of simplification, since these elements 12, 14, 40 are symmetrical with respect to their axes of rotation.

Referring next to the block diagram of FIG. 3, there will be described a control system provided to control the engine 10, lock-up clutch 32 and automatic transmission 14 of the motor vehicle. The control system includes the electronic transmission controller 184 indicated above, which is adapted to control a hydraulic control device 44. The hydraulic control device 44 includes a transmission control circuit for shifting the automatic transmission 14 to an appropriate one of the operating positions, and a lock-up clutch control circuit for controlling the operating state of the lock-up clutch 32. The transmission control circuit is provided with a first and a second solenoid-operated valve S1, S2, which have respective solenoid coils. The clutches C0, C1, C2 and brakes B0, B1, B2, B3 are selectively engaged to selectively establish the operating positions ("1st", "2nd", "3rd" and "O/D") of the transmission 14, depending upon respective combinations of the operating states of the first and second solenoid-operated valves S1, S2, as indicated in FIG. 2. In this figure, "o" indicates the energization of the solenoid coils of the valves S1, S2 or the engagement of the clutches and brakes.

Figure 4:
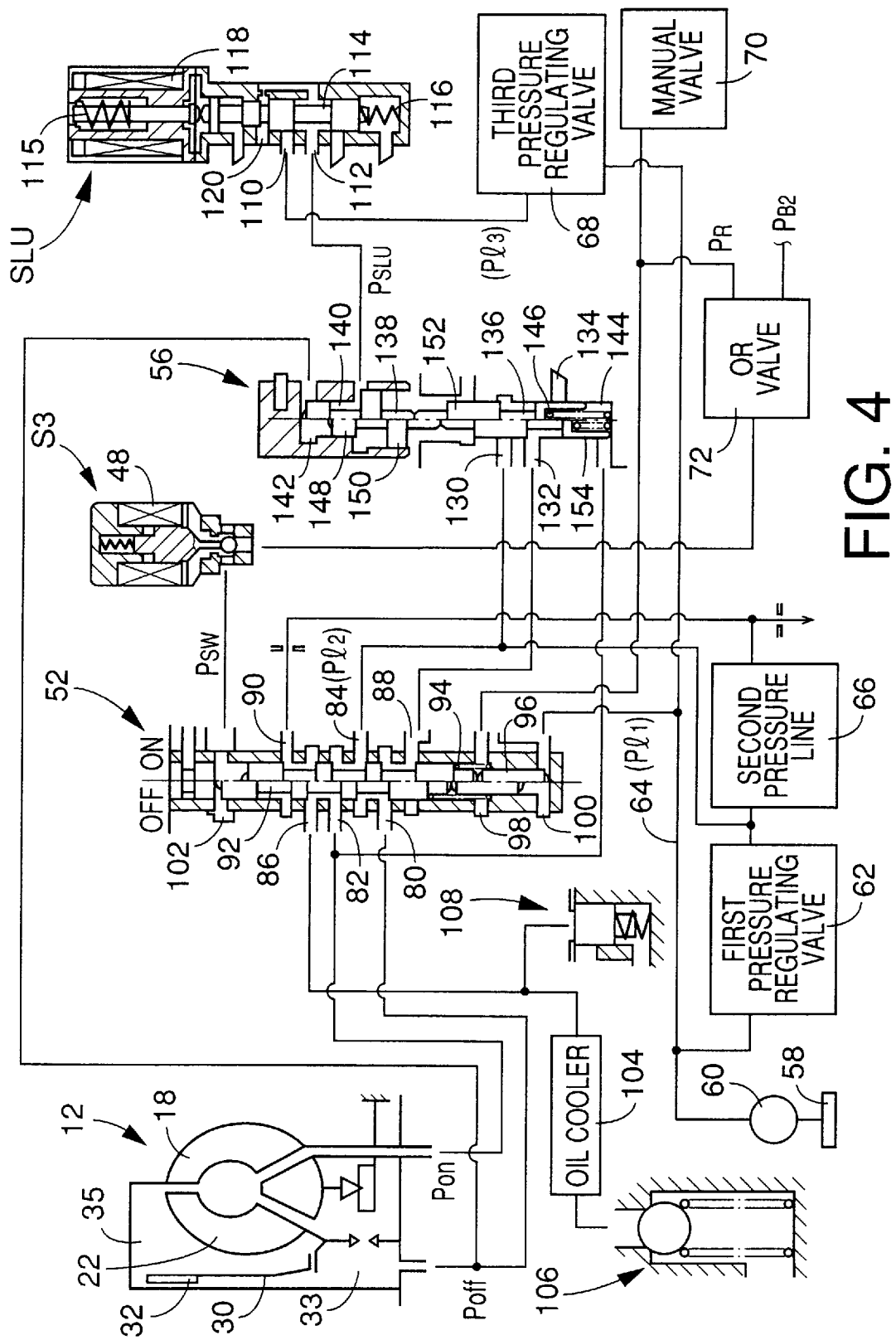
FIG. 4 is a view illustrating a part of a hydraulic control device shown in FIG. 3, which incorporates a circuit for controlling the lock-up clutch.
Figure 5:
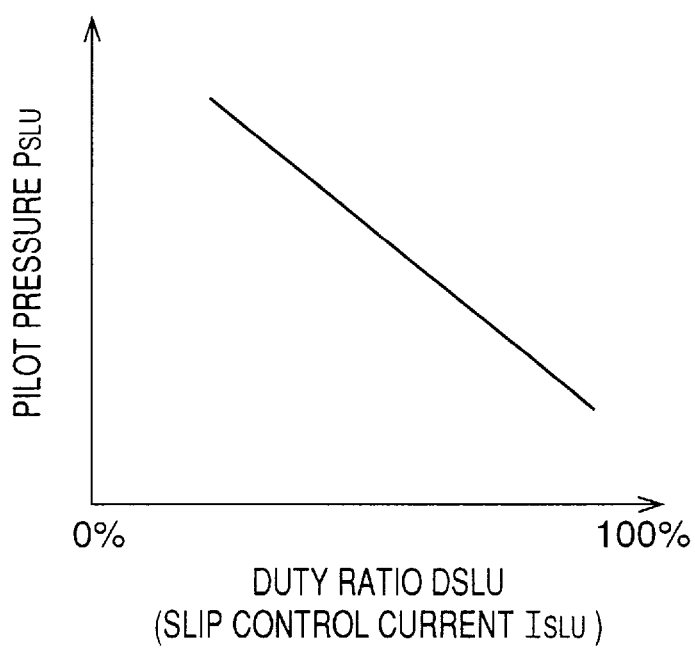
FIG. 5 is a graph indicating an output characteristic of a linear solenoid valve provided in the lock-up clutch control circuit of FIG. 4.

The lock-up clutch control circuit of the hydraulic control device 44 includes a third solenoid-operated valve S3, a lock-up relay valve 52, a linear solenoid valve SLU, and a lock-up clutch control valve 56, as shown in FIG. 4. The third solenoid-operated valve S3 has a solenoid coil 48 which is turned on and off. When the coil 48 is on, the valve 53 generates a LOCK-UP SWITCHING pressure $P_{SW}$. The lock-up relay valve 52 has a releasing state and an engaging state for releasing and engaging the lock-up clutch 32, respectively, depending upon whether the pilot pressure $P_{SW}$ is generated by the valve S3. The linear solenoid valve SLU is adapted to generate a SLIP CONTROL pilot pressure $P_{SLU}$ corresponding to a SLIP CONTROL current $I_{SLU}$ supplied from the transmission controller 184. The lock-up clutch control valve 56 is adapted to regulate a pressure difference ΔP between the pressures in the engaging and releasing oil chambers 35, 33 of the torque converter 12, according to the SLIP CONTROL pilot pressure $P_{SLU}$ received from the linear solenoid valve SLU, for thereby controlling an amount of slip of the lock-up clutch 32.

As shown in FIG. 4, the hydraulic control device 44 includes a pump 60 for pressuring a working oil sucked from a suitable reservoir through a strainer 58. The pump 60 is driven by the engine 10. The pressure of the oil delivered by the pump 60 is adjusted to a first line pressure Pl1 by a first pressure regulating valve 62 of an overflow type. The first pressure regulating valve 62 is arranged to receive a THROTTLE pilot pressure indicative of an opening TA of a first throttle valve 166 (FIG. 3), and regulate the first line pressure Pl1 in a first pressure line 64 such that the pressure Pl1 increases with the THROTTLE pilot pressure. The hydraulic control device 44 further has a second pressure regulating valve 66 of an overflow type, which is adapted to regulate the pressure of the oil received from the first pressure regulating valve 62, to a second line pressure Pl2 according to the THROTTLE pressure, so that the second line pressure Pl2 corresponds to the output torque of the engine 10. The device 44 further has a third pressure regulating valve 68, which is a pressure reducing valve adapted to reduce the first line pressure Pl1 to a predetermined third line pressure Pl3.

The motor vehicle has a shift lever 174 (FIG. 3) which has six operating positions "P" (PARKING), "R" (REVERSE), "N" (NEUTRAL), "D" (DRIVE), "S" (SECOND) and "L" (LOW), as indicated in FIG. 2. The hydraulic control device 44 includes a manual valve 70 (FIG. 4) adapted to generate a REVERSE pressure $P_R$ when the shift lever 174 is placed in the REVERSE position "R" (which is the backward drive position referred to above with respect to the automatic transmission 14). The device 44 also includes an OR valve 72 which is adapted to generate a higher one of a BRAKE B2 pressure $P_{B2}$ and the REVERSE pressure $P_R$, which serves as the LOCK-UP SWITCHING pilot pressure $P_{SW}$ generated when the valve S3 is turned ON as explained below in detail. The BRAKE B2 pressure $P_{B2}$ is generated to engage the brake B2 for establishing the second-speed ("2nd"), third-speed ("3rd") and overdrive ("O/D") positions.

The lock-up relay valve 52 has: a releasing port 80 communicating with the releasing oil chamber 33; an engaging port 82 communicating with the engaging oil chamber 35; an input port 84 adapted to receive the second line pressure Pl2; a first drain port 86 through which the oil in the engaging oil chamber 35 is discharged when the lock-up clutch 32 is released; a second drain port 88 through which the oil in the releasing oil chamber 33 is discharged when the lock-up clutch 32 is engaged; a supply port 90 adapted to receive the oil discharged from the second pressure regulating valve 66 so that the oil is cooled during engagement of the lock-up clutch 32; a spool 92 operable between an ON position and an OFF position, for switching the mutual communication or connection of the ports indicated above; a spring 94 for biasing the spool 92 toward the OFF position; a plunger 96 abuttable on the end of the spool 92 on the side of the spring 94; an oil chamber 98 defined between the above-indicated end of the spool 92 and the opposed end of the plunger 96, and adapted to receive the REVERSE pressure $P_R$ from the manual valve 70; an oil chamber 100 partially defined by the other end of the plunger 96 and adapted to receive the first line pressure Pl1; and an oil chamber 102 partially defined by the other end of the spool 92 and adapted to receive the LOCK-UP SWITCHING pressure $P_{SW}$ from the third solenoid-operated valve S3, for generating a thrust force for moving the spool 92 toward the ON position.

The third solenoid-operated valve S3 has a ball which is seated on a valve seat to disconnect a line communicating with the oil chamber 102 of the lock-up relay valve 52 and the OR valve 72 when the solenoid coil 48 is de-energized or OFF. In this state, the LOCK-UP SWITCHING pilot pressure $P_{SW}$ is not applied to the oil chamber 102. When the coil 48 is energized or ON, the ball is unseated to permit the communication between the OR valve 72 and the oil chamber 102, whereby the LOCK-UP SWITCHING pressure $P_{SW}$ is applied to the oil chamber 102. In the OFF state of the valve S3, therefore, the spool 92 of the lock-up relay valve 52 is moved to its OFF position by the biasing force of the spring 94 and a force based on the first line pressure Pl1 in the oil chamber 100, whereby the input port 84 communicates with the releasing port 80 while the first drain port 86 communicates with the engaging port 82. As a result, a pressure Poff in the releasing oil chamber 33 is made higher than a pressure Pon in the engaging oil chamber 35, to thereby release the lock-up clutch 32, while at the same time the engaging chamber 35 is drained through the first drain port 86, an oil cooler 104 and a check valve 106.

In the ON state of the valve S3, on the other hand, the LOCK-UP SWITCHING pilot pressure $P_{SW}$ is applied to the oil chamber 102, and the spool 92 is moved by a force based on the pressure $P_{SW}$, against the biasing force of the spring 94 and the force based on the first line pressure Pl1 in the oil chamber 100, whereby the input port 84 communicates with the engaging port 82 while the first and second drain ports 86, 88 communicate with the supply and releasing ports 90, 80, respectively. As a result, the pressure Pon in the engaging oil chamber 35 is made higher than the pressure Poff in the releasing oil chamber 33, to thereby engage the lock-up clutch 32, while at the same time the releasing oil chamber 33 is drained through the second drain port 88 and the lock-up clutch control valve 56.

The linear solenoid valve SLU is a reducing valve adapted to reduce the predetermined third line pressure Pl3 to the SLIP CONTROL pilot pressure $P_{SLU}$, such that the pilot pressure $P_{SLU}$ increases with an increase in the SLIP CONTROL current $I_{SLU}$ supplied from the transmission controller 184, namely, increases with an increase in a duty ratio $D_{SLU}$ of the linear solenoid valve SLU. The thus controlled pilot pressure $P_{SLU}$ is applied to the lock-up clutch control valve 56. The linear solenoid valve SLU has: a supply port 110 adapted to receive the third line pressure Pl3; an output port 112 from which the SLIP CONTROL pilot pressure $P_{SLU}$ is applied to the valve 56; a spool 114 for closing and opening the ports 110, 112; a spring 115 for biasing the spool 114 in a valve closing direction; a spring 116 for biasing the spool 114 in a valve opening direction by a force smaller than that of the spring 115; a solenoid coil 118 for biasing the spool 114 in the valve opening direction by a force determined by the SLIP CONTROL current $I_{SLU}$; and an oil chamber 120 adapted to receive a feedback pressure (SLIP CONTROL pilot pressure $P_{SLU}$) which biases the spool 114 in the valve closing direction. The spool 114 is moved to a position of equilibrium between a sum of the biasing forces of the solenoid coil 118 and the spring 116 and a sum of the biasing force of the spring 115 and a force based on the feedback pressure $P_{SLU}$.

The lock-up clutch control valve 56 has: a line pressure port 130 adapted to receive the second line pressure Pl2; an input port 132 adapted to receive the oil discharged from the releasing oil chamber 33 through second drain port 88 of the valve 52; a drain port 134 through which the oil received by the input port 132 is discharged; a spool 136 operable between a first position (indicated at left in FIG. 4) and a second position (indicated at right in FIG. 4); a plunger 138 abuttable on the spool 136 for biasing the spool 136 toward the first position; an oil chamber 140 adapted to receive the SLIP CONTROL pilot pressure $P_{SLU}$ for biasing the plunger 138 so as to generate a thrust force which biases the spool 136 toward the first position; an oil chamber 142 adapted to receive the oil pressure Poff in the releasing oil chamber 33, for biasing the plunger 138 so as to generate a thrust force which biases the spool 136 toward the first position; an oil chamber 144 adapted to receive the oil pressure Pon in the engaging oil chamber 35, for generating a thrust force for biasing the spool 136 toward the second position; and a spring 146 received in the oil chamber 144, for biasing the spool 136 toward the second position.

In the first position of the spool 136 of the lock-up clutch control valve 56, the input port 132 communicates with the drain port 134 to cause the releasing oil chamber 33 to be drained, for thereby increasing the pressure difference ΔP (=Pon−Poff) of the oil chambers 33, 35. In the second position of the spool 136, the input port 132 communicates with the line pressure port 130 to cause the second line pressure Pl2 to be applied to the releasing oil chamber 33, for thereby reducing the pressure difference ΔP.

The plunger 138 has a first land 148 adjacent to the oil chamber 142, and a second land 150 remote from the oil chamber 142. The first land 148 has a cross sectional area A1, and the second land 150 has a cross sectional area A2 larger than the area A1. The spool 136 has a third land 152 adjacent to the pilot pressure oil chamber 140, and a fourth land 154 remote from the oil chamber 140. The third land 152 has a cross sectional area A3, and the fourth land 154 has a cross sectional area equal to the cross sectional area A1. In this arrangement of the lock-up clutch control valve 56, the plunger 138 and the spool 136 are moved together as a unit with the plunger 138 held in abutting contact with the spool 136. With the movement of the plunger and spool 138, 136, the pressure difference ΔP (=Pon−Poff) on the opposite sides of the piston 30 of the lock-up clutch 32 is controlled depending upon the SLIP CONTROL pilot pressure $P_{SLU}$ generated by the linear solenoid valve SLU. The pressure difference ΔP changes with the pilot pressure $P_{SLU}$ as shown in FIG. 6, at a rate or gradient represented by a value (A2−A1)/A1.

Figure 6:
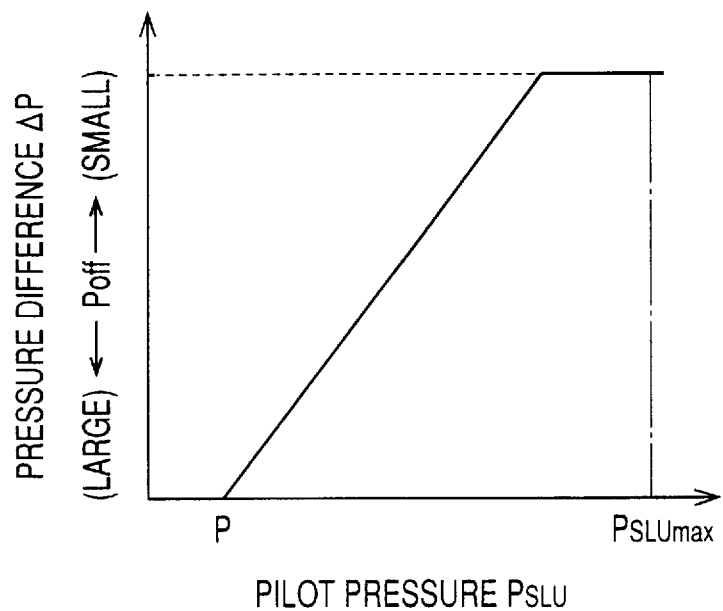
FIG. 6 is a graph indicating an output characteristic of a lock-up clutch control valve provided in the lock-up clutch control circuit of FIG. 4, namely, a relationship between a pilot pressure $P_{SLU}$ received by the lock-up clutch control valve and a pressure difference $\Delta P$ of engaging and releasing oil chambers of the lock-up clutch.

The graph of FIG. 6 indicates the output characteristic of the lock-up clutch control valve 56, namely, the relationship between the pressure difference ΔP generated by the valve 56 and the SLIP CONTROL pilot pressure $P_{SLU}$ generated by the valve SLU. While the lock-up clutch control valve 56 is ON with the spool 136 placed in the first position, an increase in the pilot pressure $P_{SLU}$ results in an increase in the pressure difference ΔP of the engaging and releasing oil chambers 35, 33, and thereby causes a decrease in a slip speed $N_{SLP}$ of the lock-up clutch 32, while a decrease in the pilot pressure $P_{SLU}$ causes an increase in the slip speed $N_{SLP}$. The slip speed $N_{SLP}$ is a difference ($N_P-N_T$) between a speed $N_P$ of the pump impeller 18 (speed $N_E$ of the engine 10) and a speed $N_T$ of the turbine impeller 22 (speed Nin of the input shaft 20).

Figure 3:
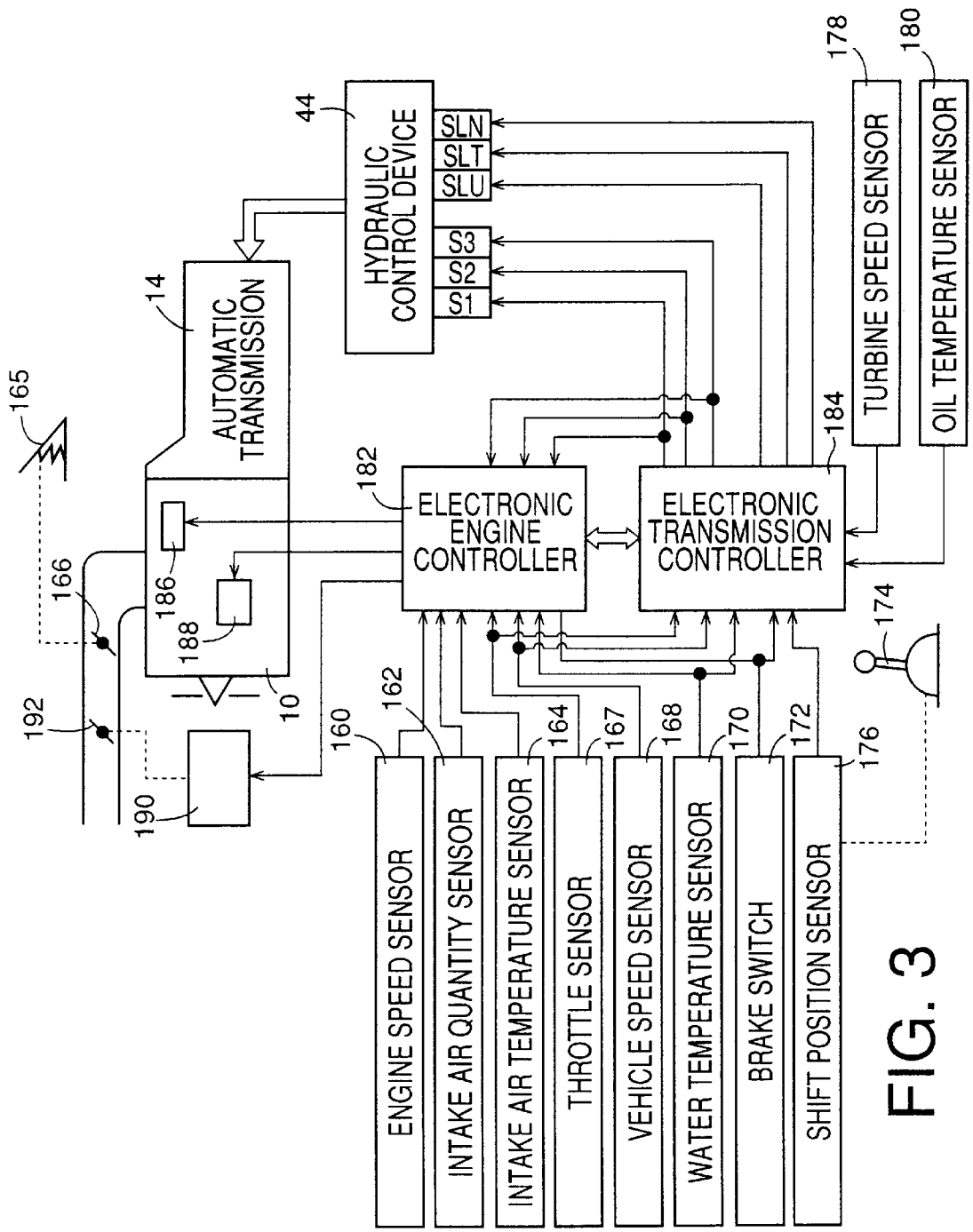
FIG. 3 is a block diagram showing a control system for the motor vehicle, which includes a transmission controller functioning as the control apparatus for the lock-up clutch and automatic transmission.

Referring back to the block diagram of FIG. 3, the motor vehicle has various sensors and switches including: an engine speed sensor 160 for detecting the speed $N_E$ of the engine 10, that is, speed $N_P$ of the pump impeller 18; an intake air quantity sensor 162 for detecting a quantity Q of an intake air sucked into the engine 10 through an intake pipe; an intake air temperature sensor 164 for detecting a temperature $T_{AIR}$ of the intake air; a throttle sensor 167 for detecting the opening TA of the first throttle valve 166 operated by an accelerator pedal 165, the throttle sensor 167 being equipped with an idling position switch for detecting the idling position of the throttle valve 166; a vehicle speed sensor 168 for detecting a running speed V of the vehicle on the basis of a speed Nout of the output shaft 40 of the automatic transmission 40; a water temperature sensor 170 for detecting a temperature $T_{WA}$ of a coolant water of the engine 10; a brake switch 172 for detecting an operation of a brake pedal; a shift position sensor 176 for detecting a currently selected operating position Ps of the automatic transmission 40, namely, a currently selected one of the operating positions "L", "S", "D", "N", "R" and "P" of the shift lever 174; a turbine speed sensor 178 for detecting the speed $N_T$ of the turbine impeller 22, that is, the speed Nin of the input shaft 20 of the transmission 20; and an oil temperature sensor 180 for detecting a temperature $T_{OIL}$ of the working oil in the hydraulic control device 44. The output signals generated by the above sensors and switch are applied directly or indirectly to an electronic engine controller 182 and the electronic transmission controller 184. The two controllers 182, 184 are connected to each other by a communication interface, for applying the necessary signals to each other.

The transmission controller 184 is comprised of a so-called microcomputer incorporating a central processing unit (CPU), a read-only memory (ROM), a random-access memory (RAM) and an interface. The CPU processes the input signals according to various control programs stored in the ROM, while utilizing a temporary data storage function of the RAM, for controlling the automatic transmission 14 and the lock-up clutch 32 by controlling the first, second and third solenoid-operated valves S1, S2, S3 and the linear solenoid valve SLU.

For controlling the automatic transmission 14 so as to shift the transmission 14 to the appropriate operating position, a plurality of shift patterns are stored in the ROM, and one of the shift patterns which corresponds to the currently selected position of the transmission 14 is selected to determine the operating position (one of the four forward drive positions) to which the transmission 14 should be shifted down or up. For instance, each shift pattern consists of a shift-down boundary line and a shift-up boundary line which are relationships between the throttle valve opening TA and the vehicle speed V. On the basis of the determined forward drive position to which the transmission 14 should be shifted, the solenoid-operated valves S1 and S2 are suitably controlled (with their solenoid coils being suitably energized or de-energized), so as to establish an appropriate combination of the operating states of the clutches and brakes C0, C1, C2, B0, B1, B2, B3, which combination corresponds to the determined forward drive position.

Figure 7:
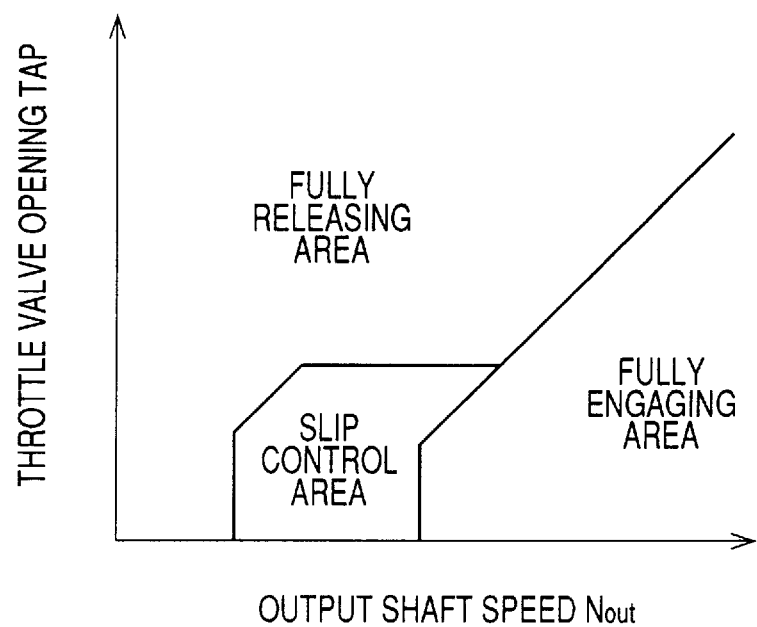
FIG. 7 is a view indicating boundaries defining different control areas of the lock-up clutch in relation to the running condition of the vehicle, which boundaries are stored in the transmission controller shown in FIG. 3.

The transmission controller 184 is adapted to control the lock-up clutch 32 in the manner explained below, when the vehicle is running with the transmission 14 placed in the third-speed or fourth-speed or overdrive position ("3rd" or "O/D"), for example. For controlling the lock-up clutch 32 differently depending upon the running condition of the vehicle, predetermined boundaries defining three different control areas as indicated in FIG. 7 are stored in the ROM. For instance, the boundaries are relationships between the throttle valve opening TA and the output speed Nout of the output shaft 40 of the transmission 14 (vehicle speed V). Described more specifically, these boundaries define a fully releasing area in which the lock-up clutch 32 should be fully released, a fully engaging area in which the clutch 32 should be fully engaged, and a slip control area in which the amount of slip of the clutch 32 should be suitably controlled according to the principle of the present invention as described below in detail. Depending upon the currently detected throttle opening TA and output speed Nout, one of the three control areas is determined or selected by the CPU of the transmission controller 184, according to the boundaries stored in the ROM.

When the vehicle running condition (TA and Nout) is in the slip control area, the lock-up clutch 32 is controlled to be held in a slipping state for transmitting power of the engine 10 to the automatic transmission 14 so as to maximize the fuel economy of the vehicle while absorbing a torque variation of the engine 10 to assure high power transmission stability and improved running stability or comfort of the vehicle. The determination as to whether the vehicle running condition falls in the slip control area according to the boundaries of FIG. 7 stored in the ROM is effected while the vehicle is accelerating.

The amount of slip of the lock-up clutch 32 is also controlled while the vehicle is coasting or decelerating with the throttle valve 166 placed in the engine idling position. This slip control is effected to increase an effect of the fuel-cut control of the engine 10. The fuel cut is performed when the engine speed $N_E$ is higher than a predetermined fuel-cut speed $N_{CUT}$, for example, 2000 r.p.m., during deceleration or coasting of the vehicle. In this case, however, the slip control area is determined on the basis of only the vehicle speed V, since the throttle opening TAP is zero during the coasting of the vehicle. For instance, the slip control area is a vehicle speed range of about 50–90 km/h when the automatic transmission 14 is placed in the fourth-speed position "4th". With the vehicle speed V being outside this range, the lock-up clutch 32 is fully released.

If the CPU of the controller 184 determines that the vehicle running condition falls in the fully engaging area, the solenoid coil of the third solenoid-operated valve S3 is energized to turn ON the lock-up relay valve 52, and the SLIP CONTROL current $I_{SLU}$ applied to the linear solenoid valve SLU is reduced to the minimum value, whereby the lock-up clutch 32 is fully engaged. If the vehicle running condition is determined to be in the fully releasing area, the solenoid coil of the valve S3 is de-energized to turn OFF the lock-up relay valve 52, so that the lock-up clutch 32 is fully released irrespective of the SLIP CONTROL current $I_{SLU}$. If the vehicle running condition is determined to be in the slip control area, the solenoid coil of the valve S3 is energized to turn ON the lock-up relay valve 52, and the SLIP CONTROL current $I_{SLU}$ to be applied to the valve SLU is adjusted according to a feedback control equation well known in the art. For instance, the SLIP CONTROL current $I_{SLU}$ is calculated to zero an error $\Delta E$ ($=N_{SLP}-$TNSLPBD) between a transient target slip speed TNSLPBD and the actual slip speed $N_{SLP}$ ($=N_E-N_T$) of the lock-up clutch 32. The feedback control equation may includes a feed forward term, and a learning control term, as needed. For instance, the feed forward term represents a value which corresponds to the output of the engine 10 such as the output torque and which improves the response of the lock-up clutch 32. The learning control term is provided to compensate for a chronological change of the friction characteristic of the lock-up clutch.

The electronic engine controller 182 is comprised of a microcomputer similar to that of the transmission controller 184, which has a CPU adapted to process the input signals according to programs stored in a ROM while utilizing a temporary data storage function of a RAM, for controlling the engine 10, more specifically, for effecting a fuel injection control for controlling a fuel injection valve 186 so as to optimize the combustion condition of the engine 10, an ignition control for controlling an ignitor 188 so as to optimize the ignition timing, a traction control for controlling a second throttle valve 192 via a throttle actuator 190 so as to control the traction force of the vehicle while preventing slipping of the drive wheels on the road surface, and a fuel-cut control for holding the fuel injection valve 186 closed while the engine speed $N_E$ is higher than a predetermined fuel-cut threshold level $N_{CUT}$ during coasting of the vehicle, so that the fuel economy of the vehicle is improved.

Figure 8:
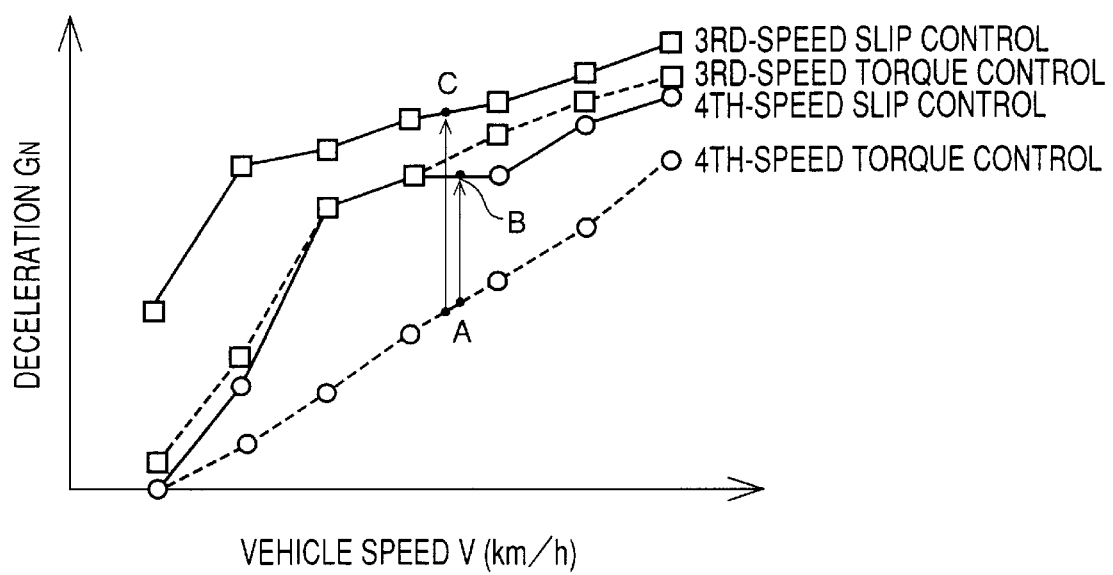
FIG. 8 is a graph for explaining deceleration value $G_N$ of the vehicle during deceleration thereof.

The graph of FIG. 8 shows relationships between the vehicle deceleration $G_N$ and the vehicle speed V during deceleration of the vehicle with the accelerator pedal 165 being placed in the non-operated position, when the automatic transmission 14 is placed in the third-speed and fourth-speed positions, and when the lock-up clutch 32 is in the slip control state or in the torque control state. In FIG. 8, broken lines between circles indicate a vehicle running condition in which the automatic transmission 14 is placed in the fourth-speed position while the lock-up clutch 32 is placed in the torque control state, and solid lines between circles indicate a vehicle running condition in which the automatic transmission 14 is placed in the fourth-speed position while the lock-up clutch 32 is placed in the slip control state. Further, broken lines between squares indicate a vehicle running condition in which the automatic transmission 14 is placed in the third-speed position while the lock-up clutch 32 is placed in the torque control state, and solid lines between squares indicate a vehicle running condition in which the automatic transmission 14 is placed in the third-speed position while the lock-up clutch 32 is placed in the slip control state.

Figure 9:
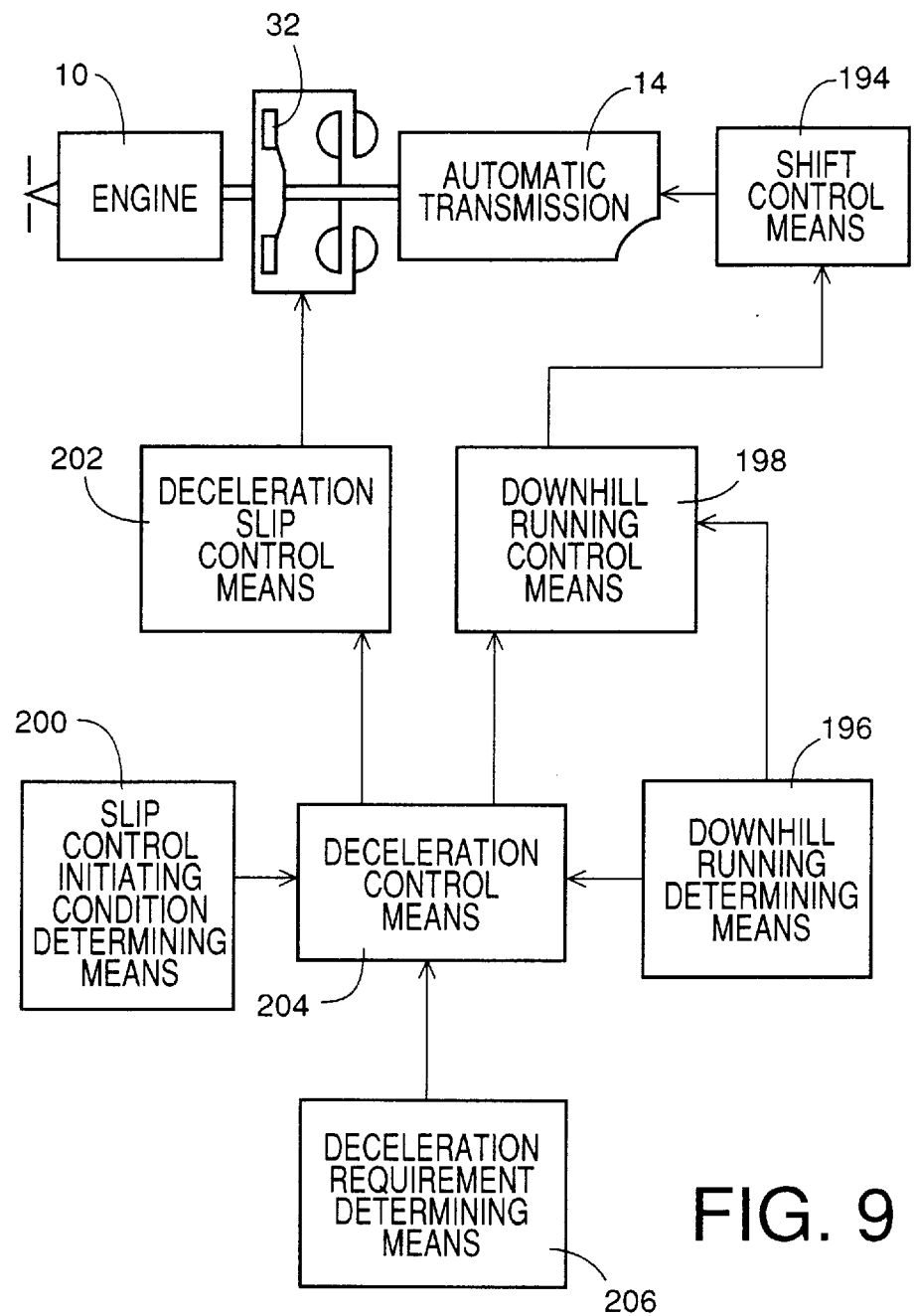
FIG. 9 is a block diagram illustrating the functions of various functional means incorporated in the transmission controller of FIG. 3.

Referring next to the block diagram of FIG. 9, there will be described the functions of various functional means provided in the electronic transmission controller 184. That is, the transmission controller 184 incorporates a shift control means 194, downhill running determining means 196, downhill running control means 198, slip control initiating condition determining means 200, deceleration slip control means 202, deceleration control means 204, and deceleration requirement determining means 206.

In the ROM of the transmission controller 184, there are stored a plurality of shift patterns used for controlling the automatic transmission 14. These shift patterns correspond to the respective forward drive positions of the automatic transmission 14. The shift control means 194 is adapted to select one of the shift patterns which corresponds to the currently selected forward drive position of the automatic transmission 14. Each shift pattern is a boundary line representative of a predetermined relationship between operating parameters of the vehicle, such as the throttle opening angle TA and the vehicle speed V which indicate the currently running state of the vehicle. The shift control means 196 determines whether the automatic transmission 14 should be shifted up or down from the currently selected position to another. This determination is effected on the basis of the detected vehicle running state as represented by TA and V, and according to the selected shift pattern.

Described in detail, the automatic transmission 14 is shifted by the shift control means 194, if the point defined by TA and V is moved across the boundary line of the selected shift pattern from one side of the boundary line to the other side. To effect an appropriate shifting action of the automatic transmission 14, the shift control means 194 controls the first and second solenoid-operated valves S1, S2.

The downhill running determining means 196 is adapted to determine whether the vehicle is running on a downhill road. This determination is effected depending upon whether the detected acceleration value of the vehicle at the current opening angle TA is higher than a predetermined threshold (a reference acceleration value for a flat road running of the vehicle) which corresponds to the current opening angle TA. That is, the downhill running determining means 196 determines that the vehicle is running on a downhill road, if the detected acceleration value is higher than the threshold. The acceleration value may be obtained on the basis of a rate of change in the interval of pulses generated by the vehicle speed sensor 168.

The downhill running control means 198 is adapted to shift down the automatic transmission 14 from the highest-gear position, namely, from the fourth-speed position "4th" to the next-lower-gear position, namely, to the third-speed position, upon determination by the downhill running determining means 198 that the vehicle is running on a downhill road, if the accelerator pedal 165 is placed in the non-operated or fully released position while the automatic transmission 14 is placed in the fourth-speed position. This shift-down action of the automatic transmission 14 by the downhill running control means 198 is dominant over the shifting action according to the selected shift pattern. The accelerator pedal 165 is found to be placed in the non-operated position if the throttle opening angle TA is zero or if the idling position switch of the throttle sensor 167 is in the ON position.

The slip control initiating condition determining means 200 is adapted to determine whether all of predetermined deceleration slip control initiating conditions for permitting the deceleration slip control by the deceleration slip control means 202 have been satisfied. The deceleration slip control initiating conditions may include: a condition that the throttle opening angle TA is zero, or the idling position switch of the throttle sensor 167 is in the ON position; a condition that the vehicle speed V is held within a predetermined deceleration slip control range of about 50–90 km/h, for example; and a condition that the temperature $T_{OIL}$ detected by the oil temperature sensor 180 is held in a predetermined deceleration slip control range of about 60°–110° C., for example.

The deceleration slip control means 202 is adapted to effect a deceleration slip control of the lock-up clutch 32 during deceleration or coasting of the vehicle, if the determining means 200 determines that all of the predetermined deceleration slip control initiating conditions have been satisfied. In the deceleration slip control, the deceleration slip control means 202 controls the drive current $I_{SLU}$ of the linear solenoid valve SLU so that the slip speed of the lock-up clutch 32 during coasting of the vehicle coincides with the target slip speed TNSLPBD, namely, so that the speed difference ΔN=NSLP−TNSLPBD is zeroed.

The deceleration control means 204 is adapted to inhibit the shift-down action of the automatic transmission 14 by the downhill running control means 198, even if the downhill running determining means 196 determines that the vehicle is running on a downhill road, or even if predetermined downhill control initiating conditions have been satisfied, when the slip control initiating condition determining means 200 determines that the deceleration slip control initiating conditions have been satisfied.

The deceleration requirement determining means 206 is adapted to determine whether the vehicle is required to be further decelerated, for example, whether the downhill road gradient is increasing, or whether the brake pedal is operated. This determination may be effected by detecting the gradient of the road surface by comparing the actual acceleration with a predetermined threshold (reference deceleration value for flat road running of the vehicle), or on the basis of the output signal of the brake sensor 172. The deceleration control means 204 continues to inhibit the shift-down action of the automatic transmission 14 by the downhill running control means 198, or continues to disable the downhill running control means 198, until the deceleration requirement determining means 206 has determined that the vehicle is required to be further decelerated.

The deceleration control means 204 is further adapted to permit the shift-down action of the automatic transmission 14 by the downhill running control means 198, if the deceleration slip control of the lock-up clutch 32 by the deceleration slip control means 202 is terminated while the vehicle is running on a downhill road, namely, while the downhill running determining means 196 continues to determine that the vehicle is running on a downhill road.

The deceleration control means 204 is further adapted to permit the shift-down action of the automatic transmission 14 by the downhill running control means 198 and at the same time inhibit the deceleration slip control of the lock-up clutch 32 after the shift-down action to the third-speed position, if the downhill running determining means determines 196 that the vehicle is running on a downhill road, while the lock-up clutch 32 is placed in the fully released state, namely, while the predetermined deceleration slip control initiating conditions are not satisfied.

The deceleration control means 204 is also adapted to permit the shift-down action of the automatic transmission 14 by the downhill control means 198 and at the same time inhibit the deceleration slip control of the lock-up clutch 32 after the shift-down action to the third-speed position, if the deceleration requirement determining means 206 determines that the vehicle is required to be further decelerated. If the determining means 206 determines that the vehicle is not required to be further decelerated, the deceleration control means 024 inhibits both the shift-down action of the automatic transmission 14 by the downhill running control means 198 and the deceleration slip control of the lock-up clutch 32 by the deceleration slip control means 202.

Figure 10:
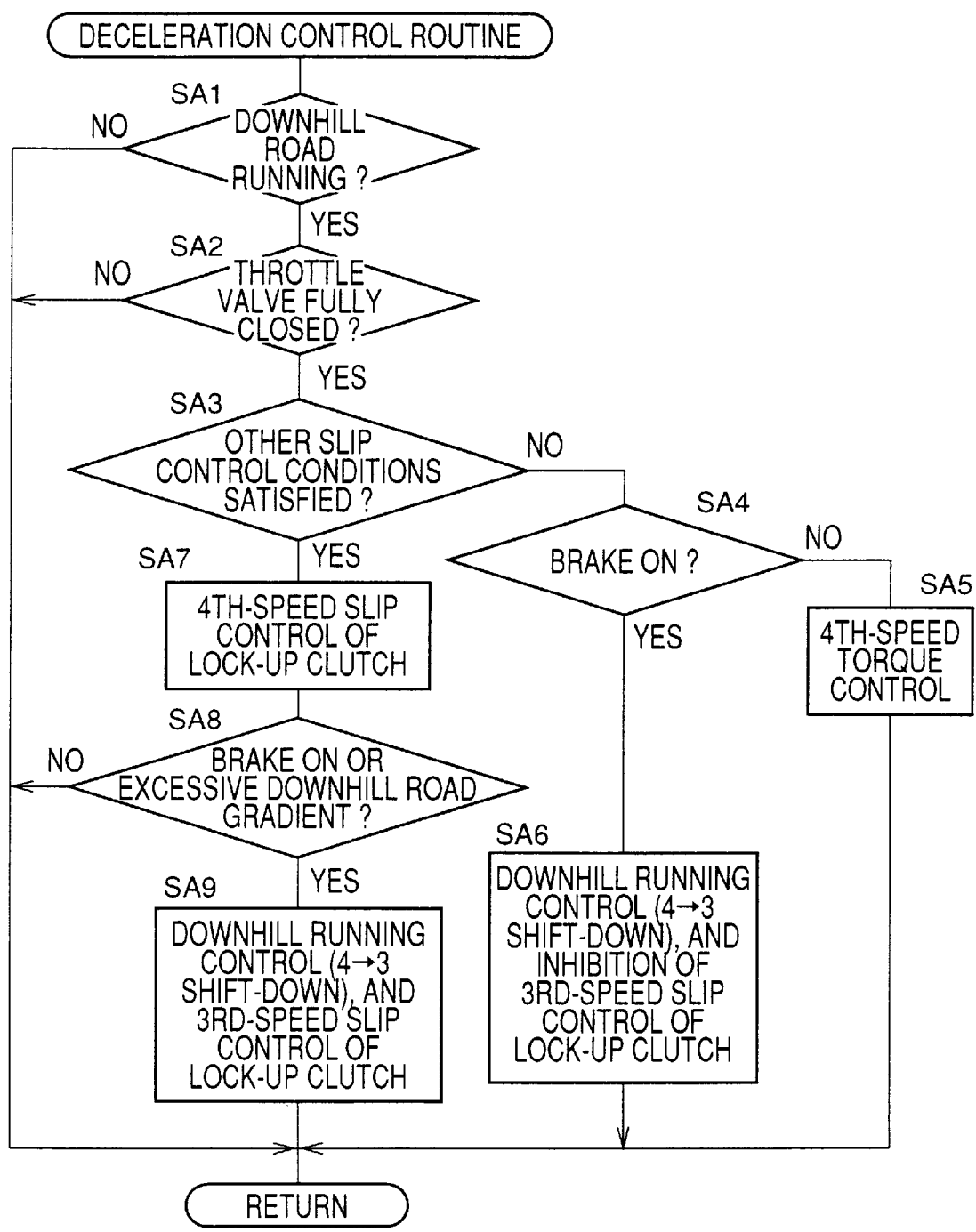
FIG. 10 is a flow chart illustrating a deceleration control routine executed by the transmission controller of FIG. 3.
Figure 11:
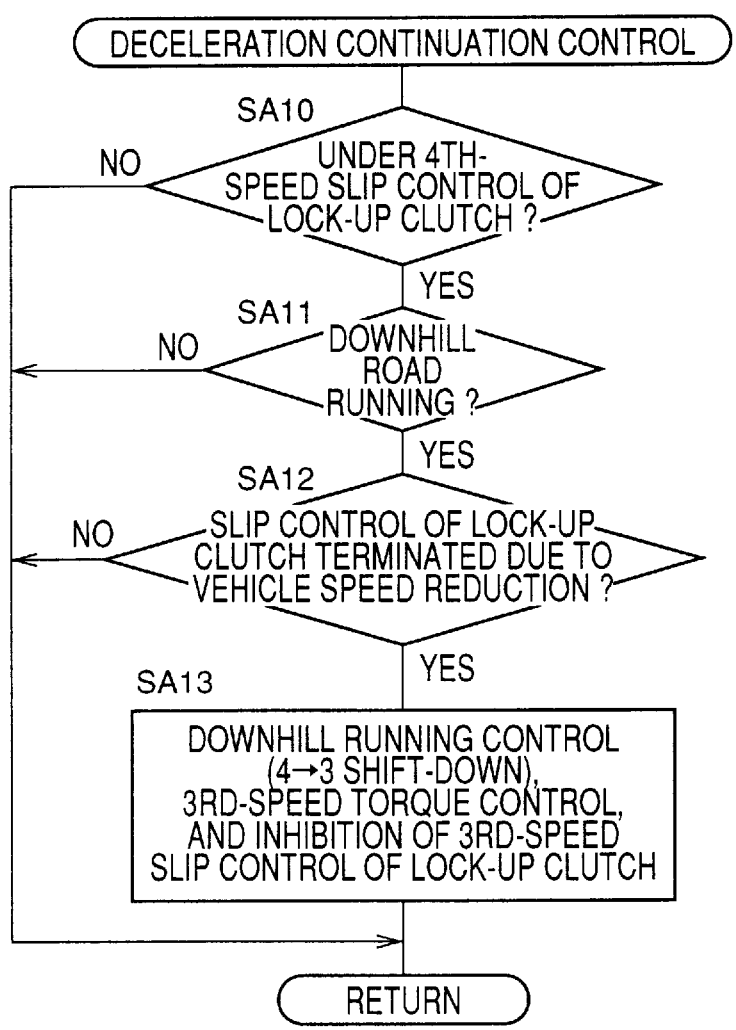
FIG. 11 is a flow chart illustrating a deceleration continuation control routine executed by the transmission controller of FIG. 3.

Referring to the flow charts of FIGS. 10 and 11, there will be described a deceleration control routine and a deceleration control continuation control routine, which are executed by the electronic transmission controller 184. The deceleration control routine of FIG. 10 is executed with the automatic transmission 14 placed in the fourth-speed position "4th", so as to select an engine brake application by the downward running control means 198 or an engine brake application by the deceleration slip control means 202. The deceleration continuation control routine of FIG. 11 is formulated to permit and continue the engine brake application by the downward running control means 198, when the vehicle speed V falls below the lower limit of a predetermined range in which the deceleration slip control of the lock-up clutch 32 by the deceleration slip control means 202 is permitted. Operations of the shift control means 194, downward running control means 198 and deceleration slip control means 202 are well known in the art, as disclosed in JP-B-61-48019 and JP-A-7-39993.

The deceleration control routine illustrated in the flow chart of FIG. 10 is initiated with step SA1 corresponding to the downhill running determining means 196, to determine whether the vehicle is running on a downhill road. The downhill running determining means 196 determines that the vehicle is running on a downhill road, if the actual acceleration of the vehicle exceeds a predetermined threshold, which is a reference acceleration value during running of the vehicle on a flat road surface. If a negative decision (NO) is obtained in step SA1, one cycle of execution of the routine of FIG. 10 is terminated. If an affirmative decision (YES) is obtained in step SA1, the control flow goes to step SA2 to determine whether the throttle valve 166 is fully closed, that is, whether the vehicle is deceleration or coasting with the throttle opening angle TA being zero. This determination is effected on the basis of the output signal of the throttle sensor 167. If a negative decision (NO) is obtained in step SA2, one cycle of execution of the routine is terminated. If an affirmative decision (YES) is obtained in step SA2, the control flow goes to step SA3 to determine whether the other deceleration slip control initiating conditions are satisfied. As described above, these other initiating conditions include the condition that the vehicle speed V is in the predetermined deceleration slip control range of about 50–90 km/h, and the condition that the oil temperature $T_{OIL}$ is in the predetermined deceleration slip control range of about 60°–110° C. Steps SA2 and SA3 correspond to the slip control initiating condition determining means 200.

If the vehicle speed V or the oil temperature $T_{OIL}$ is not within the deceleration control range, a negative decision (NO) is obtained in step SA3, and the control flow goes to step SA4 to determine whether the brake pedal has been operated, that is, to determine whether the vehicle is required to be further decelerated during coasting or deceleration of the vehicle (with the throttle valve 166 being fully closed). This determination is effected on the basis of the output signal of the brake switch 172. Step SA4 corresponds to the deceleration requirement determining means. If a negative decision (NO) is obtained in step SA4, it means that the vehicle is not required to be further decelerated. In this case, the control flow goes to step SA5 in which the automatic transmission 14 is held in the fourth-speed position "4th" by the shift control means 194, while the lock-up clutch 32 is not engaged. That is, the vehicle is coasting with the automatic transmission 14 placed in the fourth-speed position and with the lock-up clutch 32 placed in the torque control state.

If the brake pedal is operated during coasting of the vehicle, an affirmative decision (YES) is obtained in step SA4, and the control flow goes to step SA6 in which downhill running control means 198 commands the shift control means 194 to shift down the automatic transmission 14 from the fourth-speed position "4th" to the third-speed position "3rd", and substantially inhibits the deceleration slip control means 202 from operating to effect the slip control of the lock-up clutch 32 with the automatic transmission 14 placed in the third-speed position.

If the vehicle speed V and the oil temperature $T_{OIL}$ are both within the predetermined deceleration slip control ranges indicated above, an affirmative decision (YES) is obtained in step SA3, the control flow goes to step SA7 in which the deceleration slip control means 202 effects the deceleration slip control of the lock-up clutch 32 with the automatic transmission 14 placed in the fourth-speed position, such that the slip speed $N_{SLP}$ coincides with a predetermined slip speed TNSLPBD, whereby an engine brake is applied to the vehicle with the engine speed $N_E$ being raised by a drive force transmitted from the drive wheels to the engine 10 through the slip controlled lock-up clutch 32.

Step SA7 is followed by step SA8 corresponding to the deceleration requirement determining means 206, to determine whether the vehicle is required to be further decelerated, namely, whether the downhill road surface gradient is higher than a predetermined upper limit, or whether the brake pedal has been depressed. The determination as to whether the downhill road surface gradient is higher than the upper limit may be effected by comparing the actual acceleration value of the vehicle with a predetermined reference value. The determination as to whether the brake pedal has been depressed may be effected on the basis of the output signal of the brake switch 172. If a negative decision (NO) is obtained in step SA8, one cycle of execution of the routine of FIG. 8 is terminated. If an affirmative decision (YES) is obtained in step SA8, the control flow goes to step SA9 in which the downhill running control means 198 commands the shift control means 194 to shift down the automatic transmission 14 from the fourth-speed position to the third-speed position while the deceleration slip control means 202 effects the slip control of the lock-up clutch 32 after the automatic transmission 14 is shifted down to the third-speed position.

The deceleration continuation control routine of FIG. 11 is initiated with step SA10 to determine whether the vehicle is in the fourth-speed slip control mode in which the automatic transmission 14 is placed in the fourth-speed position "4th" while the lock-up clutch 32 is in the deceleration slip control state. If a negative decision (NO) is obtained in step SA10, one cycle of execution of the routine of FIG. 11 is terminated. If an affirmative decision (YES) is obtained in step SA10, the control flow goes to step SA11 identical with step SA1, to determine whether the vehicle is running on a downhill road. If a negative decision (NO) is obtained in step SA11, one cycle of execution of the routine is terminated. If an affirmative decision (YES) is obtained in step SA11, the control flow goes to step SA12 to determine whether the deceleration slip control of the lock-up clutch 32 by the deceleration slip control means 202 has been terminated since the vehicle speed V falls below the lower limit of the deceleration slip control range, e.g., below 50 km/h.

If a negative decision (NO) is obtained in step SA12, one cycle of execution of the routine is terminated. If an affirmative decision (YES) is obtained in step SA12, the control flow goes to step SA13 in which the downhill running control means 198 commands the shift control means 194 to shift down the automatic transmission 14 from the fourth-speed position to the third-speed position, and commands the deceleration slip control means 202 to hold the lock-up clutch 32 in the third-speed torque control state while inhibiting the deceleration slip control of the lock-up clutch 32.

It will be understood from the foregoing description of the present embodiment that steps SA6, SA9 and SA13 correspond to the downhill running control means 198 for commanding the shift control means (194) to shift down the automatic transmission 14 from the fourth-speed position to the third-speed position when the vehicle initiates a running on a downhill road, and that steps SA7 and SA9 correspond to the deceleration slip control means 202 for effecting the slip control of the lock-up clutch 32 during deceleration of the vehicle. It will also be understood that steps SA5, SA6, SA7, SA9 and SA13 correspond to the deceleration control means 204, which is adapted to control the downhill running control means 198 and the deceleration slip control means 202 in response to the outputs of the downhill running determining means 196, deceleration slip control initiating condition determining means 200 and deceleration requirement determining means 206, so that the automatic transmission 14 and the lock-up clutch 32 are controlled during deceleration or coasting of the vehicle, as described above with respect to the steps SA5–SA7, SA9 and SA13.

In the control apparatus constructed according to the presently preferred embodiment of this invention described above, the deceleration control means 204 (step SA7) inhibits the downhill running control means 198 from shifting down the automatic transmission 14 from the fourth-speed position to the third-speed position if the slip control initiating condition determining means 200 (steps SA2, SA3) determines that the predetermined deceleration slip control initiating conditions have been satisfied, even if the downhill running determining means 196 (SA1) determines that the vehicle is running on a downhill road. In this condition, therefore, only the deceleration slip control of the lock-up clutch 32 by the deceleration slip control means 202 is effected without the shift-down action of the automatic transmission 14 during deceleration of the vehicle on a downhill road. Accordingly, the present control apparatus is adapted to prevent an excessive engine brake application to the vehicle due to concurrent operations of the deceleration slip control means 202 and the downhill running control means 198 during deceleration of the vehicle on the downhill road. In other words, only the engine brake by the slip control of the lock-up clutch 32 is applied to the vehicle, whereby the vehicle can be run with a high degree of stability. In the conventional control apparatus for the lock-up clutch and automatic transmission, the shift-down action of the automatic transmission by the downhill running control and the deceleration slip control of the lock-up clutch by the deceleration slip control means are simultaneously effected, whereby the deceleration value $G_N$ of the vehicle suddenly increases by a considerably large amount from a level A to a level C, as indicated in FIG. 8. In the present control apparatus, the deceleration value $G_N$ increases from the level A to a level B, which is considerably lower than the level C.

In the present embodiment, the deceleration control means 204 (step SA7) is adapted to permit only the deceleration slip control of the lock-up clutch 32 while inhibiting the shift-down action of the automatic transmission 14, when the vehicle is coasting with the accelerator pedal 165 being fully released. In other words, the deceleration slip control of the lock-up clutch 32 is dominant over the shift-down action of the automatic transmission 14 when the accelerator pedal 165 is released to the non-operated position to initiate a coasting run of the vehicle. This arrangement assures a higher degree of running stability of the vehicle than in an arrangement in which the shift-down action of the automatic transmission 14 is dominant over the deceleration slip control of the lock-up clutch 32, namely, only the shift-down action is permitted.

The deceleration control means 204 (step SA7) is further adapted to be responsive to the deceleration requirement determining means 206 (step SA8) which is adapted to determine whether the vehicle is required to be further decelerated during deceleration or coasting of the vehicle. The deceleration control means 204 inhibits the shift-down action of the automatic transmission 14 by the downhill running control means 198 during deceleration of the vehicle even on a downhill road, until the deceleration requirement determining means 206 determines that the vehicle is required to be further decelerated. In other words, the deceleration control means 204 permits the shift-down action of the automatic transmission 14 by the downhill running control means 198 only after the determination by the determining means 206 that the vehicle is required to be further decelerated. In this condition, the vehicle is decelerated by a larger amount of brake application by both the deceleration slip control of the lock-up clutch 32 and the shift-down action of the automatic transmission 14, whereby the deceleration value $G_N$ of the vehicle is increased to the higher level C indicated in FIG. 8.

The deceleration control means 204 (step SA13) is further adapted to permit the shift-down action of the automatic transmission 14 by the downhill running control means 198 when the deceleration slip control of the lock-up clutch 32 by the deceleration slip control means 202 is terminated, during running of the vehicle on a downhill road, that is, while the downhill running determining means 196 determines that the vehicle is running on a downhill road. For instance, the deceleration slip control of the lock-up clutch 32 is terminated when the vehicle speed V falls below the lower limit of the deceleration slip control range. In this case, the automatic transmission 14 is shifted down by the downhill running control means 198, whereby the deceleration value $G_N$ is increased from the level B to the level C indicated in FIG. 8. Thus, the deceleration slip control of the lock-up clutch 32 is followed by the shift-down action of the automatic transmission 14, so that the engine brake is first applied to the vehicle by the deceleration slip control, and is then applied by the shift-down action of the automatic transmission 14.

The deceleration control means 204 (step SA6) is also arranged to permit the shift-down action of the automatic transmission 14 by the downhill running control means 198 and at the same time inhibits the deceleration slip control of the lock-up clutch 32 by the deceleration slip control means 202 after the shift-down action, if the slip control initiating condition determining means 200 determines that the predetermined deceleration slip control initiating conditions have not been satisfied, while the downhill running determining means 196 determines that the vehicle is running on a downhill road. Therefore, the automatic transmission 14 is permitted to be shifted down during running of the vehicle on a downhill road without the deceleration slip control of the lock-up clutch 32, so that the engine brake is applied to the vehicle by the shift-down action of the automatic transmission 14, while the engine brake application by the deceleration slip control of the lock-up clutch 32 is inhibited after the shift-down action of the automatic transmission 14, to prevent an excessive amount of engine brake application to the vehicle.

The deceleration control means 204 (steps SA5, SA6) is further adapted to permit the shift-down action of the automatic transmission 14 by the downhill running control means 198 and at the same time inhibits the deceleration slip control of the lock-up clutch 32 by the deceleration slip control means 202 after the shift-down action, if the deceleration requirement determining means (step SA4) determines that the vehicle is required to be further decelerated. If the deceleration requirement determining means 206 determines that the vehicle is not required to be further decelerated, the deceleration control means 204 inhibits both the shift-down action by the downhill running control means 198 and the deceleration slip control by the deceleration slip control means 202. Thus, the shift-down action of the automatic transmission 14 is permitted only where it is necessary to further decelerate the vehicle, and is inhibited while the vehicle is coasting without a need of further deceleration. This arrangement is effective to improve the fuel economy and the running stability of the vehicle.

While the present invention has been described in detail in its presently preferred embodiment, it is to be understood that the invention is not limited to the details of the illustrated embodiment, but may be otherwise embodied.

For instance, the automatic transmission 14 having the four forward drive positions may be replaced by an automatic transmission having not more than three or at least five forward drive positions. Where the automatic transmission has five forward drive positions, the downhill running control means 198 is adapted to shift down the automatic transmission from the fifth-speed position to the fourth-speed position.

While the slip control initiating condition determining means 200 corresponds to steps SA2 and SA3, it may be adapted to implement only one of these steps SA2 and SA3.

The deceleration slip initiating conditions to be checked by the slip control initiating condition determining means 200 may be suitably changed or include a condition or conditions other than those described above.

The deceleration requirement determining means 206 may be adapted to determine the presence of a requirement for further deceleration of the vehicle during deceleration thereof, on the basis of a rate at which the accelerator pedal 165 is returned to the non-operated position, or a time duration between the moment of releasing of the accelerator pedal 165 and the moment of depression of the brake pedal.

While the throttle opening angle TA is used in the illustrated embodiment as a parameter indicative of the currently required output of the engine 10, the throttle opening angle TA may be replaced by any variable indicative of the engine load, such as the amount of operation of the accelerator pedal 165, an amount of fuel injection into the engine, or an intake air quantity of the engine.

Although the deceleration control routine of FIG. 10 and the deceleration continuation control routine of FIG. 11 are executed independently of each other, the routine of FIG. 11 may be incorporated in the routine of FIG. 10.

The torque converter 12 including the lock-up clutch 32 may be replaced by a fluid coupling including the lock-up clutch 32. In this respect, the principle of the present invention is applicable to any power transmitting system including a fluid-filled power transmitting device equipped with a lock-up clutch, and an automatic transmission.

It is to be understood that the present invention may be embodied with various other changes, modifications and improvements, which may occur to those skilled in the art, without departing from the spirit and scope of the invention defined in the following claims.

What is claimed is:

1. An apparatus for controlling an automatic transmission, and a lock-up clutch of a fluid-filled power transmitting device disposed between an engine and said automatic transmission, in a power transmitting system of a motor vehicle, said apparatus comprising:

downhill running control means for shifting down said automatic transmission when the motor vehicle initiates a running on a downhill road;

deceleration slip control means for effecting a slip control to control an amount of slip of said lock-up clutch during deceleration of the motor vehicle;

slip control initiating condition determining means for determining whether at least one predetermined deceleration slip initiating condition required for activating said deceleration slip control means to initiate said slip control of said lock-up clutch has been satisfied;

downhill running determining means for determining whether the motor vehicle is running on a downhill road; and deceleration control means for permitting said deceleration slip control means to effect said slip control of said lock-up clutch and inhibits said downhill running control means from shifting down said automatic transmission, if said slip control initiating condition determining means determines that said at least one predetermined deceleration slip initiating condition has been satisfied, and if said downhill running determining means determines that the motor vehicle is running on said downhill road.

2. An apparatus according to claim 1, further comprising deceleration requirement determining means for determining whether the vehicle is required to be further decelerated during deceleration of the vehicle, and wherein said deceleration control means inhibits said downhill running control means from shifting down said automatic transmission during running of the vehicle on said downhill road, until said deceleration requirement determining means determines that the vehicle is required to be further decelerated.

3. An apparatus according to claim 1, wherein said deceleration control means permits said downhill running control means to shift down said automatic transmission when said slip control of said lock-up clutch by said deceleration slip control means is terminated, while said downhill running determining means determines that the vehicle is running on said downhill road.

4. An apparatus according to claim 1, wherein said deceleration control means permits said downhill running control means to automatically shift down said automatic transmission and inhibits said deceleration slip control means from effecting said slip control of said lock-up clutch after a shift-down action of said automatic transmission, if said slip control initiating condition determining means determines that said at least one predetermined deceleration slip control initiating condition has not been satisfied, and if said downhill running determining means determines that the motor vehicle is running on said downhill road.

5. An apparatus according to claim 1, wherein said deceleration control means permits said downhill running control means to shift down said automatic transmission during running of the vehicle on said downhill road, and inhibits said deceleration slip control means from effecting said slip control of said lock-up clutch after a shift-down action of said automatic transmission.

6. An apparatus according to claim 1, wherein said at least one predetermined deceleration slip control initiating condition includes a condition that a currently required output of said engine is substantially zero.

7. An apparatus according to claim 1, wherein said at least one predetermined deceleration slip control initiating condition includes a condition that the motor vehicle is running at a speed within a predetermined range.

8. An apparatus according to claim 2, wherein said deceleration requirement determining means includes means for determining whether a brake is operated during deceleration of the vehicle on said downhill road.

9. An apparatus according to claim 2, wherein said deceleration requirement determining means includes means for determining whether a gradient of said downhill road is larger than a predetermined upper limit.

10. An apparatus according to claim 1, wherein said automatic transmission has four forward drive positions including a fourth-speed position as a highest-gear position and a third-speed position as a second-highest-gear position, and said downhill running control means shifts down said automatic transmission from said fourth-speed position to said third-speed position when the motor vehicle initiates the running on said downhill road.

11. An apparatus according to claim 1, wherein said fluid-filled power transmitting device includes a torque converter equipped with said lock-up clutch.

* * * * *